United States Patent
Burgess

[19]

[11] Patent Number: 6,103,337
[45] Date of Patent: Aug. 15, 2000

[54] FIBER-REINFORCED COMPOSITE MATERIALS STRUCTURES AND METHODS OF MAKING SAME

[75] Inventor: Keith E. Burgess, Kennebunk, Me.

[73] Assignee: Albany International Techniweave, Inc., Rochester, N.H.

[21] Appl. No.: 09/112,493

[22] Filed: Jul. 9, 1998

[51] Int. Cl.[7] .................................... B32B 5/12
[52] U.S. Cl. .................. 428/119; 428/102; 428/223; 156/92; 156/93; 52/309.1
[58] Field of Search ..................... 428/102, 119, 428/120, 223; 156/93, 92; 52/309.1

[56] References Cited

U.S. PATENT DOCUMENTS

| | | | |
|---|---|---|---|
| 4,218,276 | 8/1980 | King | 156/92 |
| 4,256,790 | 3/1981 | Lackman et al. | 428/73 |
| 4,331,495 | 5/1982 | Lackman et al. | 156/93 |
| 4,606,961 | 8/1986 | Munsen et al. | 428/119 |
| 4,992,317 | 2/1991 | Chess et al. | 428/102 |
| 5,021,281 | 6/1991 | Bompard et al. | 428/116 |
| 5,429,853 | 7/1995 | Darrieux | 428/102 |
| 5,460,673 | 10/1995 | Cahuzac | 428/102 |

*Primary Examiner*—Alexander Thomas
*Attorney, Agent, or Firm*—Pitney, Hardin, Kipp & Szuch, LLP

[57] ABSTRACT

Reinforcement preforms and methods for making same for use in fiber-reinforced composite materials structures are disclosed, in which the reinforcement preforms comprise first and second reinforcement preform elements which include strength reinforcement fibers that are in desired directional orientation. The first element has a cross-fiber surface which extends transverse of its constituent strength reinforcement fibers and is in contacting juxtaposition to a selected surface region of the second element, forming an abutment therebetween. Abutment strength reinforcing fibers, which may optionally be introduced in situ by a continuum of fibers, such as a yarn or thread, extend through at least a portion of said second element and its said selected surface region, the abutment, said cross-fiber edge surface, and into the first element substantially in the direction of orientation to its constituent strength fibers to which its cross-fiber surface is transverse.

21 Claims, 3 Drawing Sheets

FIBER-REINFORCED COMPOSITE MATERIALS STRUCTURES AND METHODS OF MAKING SAME

BACKGROUND OF INVENTION

The use of reinforced composite materials to produce structural components is now widespread, particularly in applications where their desirable characteristics are sought of being light in weight, strong, tough, thermally resistant, self-supporting and adaptable to being formed and shaped. Such components are used, for example, in aeronautical, aerospace, satellite, battery, recreational (as in racing boats and autos), and other applications.

As is known in the prior art, typically such components consist of reinforcement materials embedded in matrix materials. The reinforcement component may be made from materials such as glass, carbon, ceramic, aramid (e.g., "KEVLAR"), polyethylene, and/or other materials which exhibit desired physical, thermal, chemical and/or other properties, chief among which is great strength against stress failure. Through the use of such reinforcement materials which ultimately become a constituent element of the completed component, the desired characteristics of the reinforcement materials, such as very high strength, are imparted to the completed composite component. The constituent reinforcement materials may be in any one or more of the following physical forms: fibers per se, monofilaments, multifilaments, yarns, twisted tow or untwisted tow or sliver produced from fibers and/or other forms of continuums. As such, they may be formed into batts, arrays or other groupings, and/or they may be woven, knitted or otherwise oriented into desired configurations and shapes for reinforcement preforms. In any event, usually particular attention is paid to ensure the optimum utilization of the properties for which the constituent reinforcing materials have been selected, such as by directionally orienting them as hereinafter described. Reinforcement material for use as elements in composite structures within the contemplation of this invention, in all of the various compositions, forms and configurations which they may take (including, without limitation, those listed above and referred to elsewhere herein), are referred to herein as "reinforcement preforms". Usually such reinforcement preforms are combined with matrix material to form desired finished components or to produce working stock for the ultimate production of finished components.

One of the properties frequently sought in selecting the material from which to make such reinforcement preforms forms is that of high strength. However, a typical characteristic of materials which exhibit that property is that their highest strength by a significant margin is in the direction of the long axes of the constituent fibers or filaments. For this reason, a practice in fabricating such reinforcement preforms is to so orient the reinforcement preform constituent materials that their long axes are substantially in the same direction as will be the forces to which the finished components in be subjected. Since those forces may be multi-directional, in some applications the reinforcement material may be oriented multi-directionally, typically in a lamination of two or more plies, to render the strength properties of the finished component operable in more than one direction, even to the point of being quasi-isotropic. By this means, such forces may be caused to be borne primarily by fibers whose long axes are oriented in the direction those forces, thus enabling the strengthening constituents of the composite structures to present their highest load-bearing capabilities to them. This principle is also followed in producing long continuums of such reinforcing materials, as in the forming of yarn, thread or other continuums, such as those used for stitching components together, and in the forming of sheets or strips which are anticipated to bear forces primarily in selected directions. Such continuums in the form of a stitching thread or yarn may be made as loosely constructed tow or sliver in which the constituent fibers have been combined at a long lay length, so that the long axes of substantially the preponderance of the constituent fibers are as nearly straight as possible and are substantially parallel to the long axis of the continuum, thereby enhancing the strength bearing capabilities of the continuum in that long axis direction. Similarly, in a sheet or strip, the preponderance of the constituent reinforcing materials, in whatever form they are presented (e.g., as individual fibers, or as continuums, or as fibers in single or overlaid batts, tow, sliver, etc.), may typically be oriented substantially in the anticipated direction in which high strength characteristics are to be imparted to the reinforcing preform and the component of which it is to become a part.

After the desired reinforcement preform has been constructed, matrix material may be introduced to and into the pre-form, so that typically the reinforcement preform becomes encased in the matrix material and matrix material fills the intersticial areas between the constituent elements of the reinforcement preform. The matrix material may be any of a wide variety of materials, such as epoxy, polyester, vinyl-ester, ceramic, carbon and/or other materials, which also exhibit desired physical, thermal, chemical and/or other properties. The materials chosen for use as the matrix may or may not be the same as that of the reinforcement preform and may or may not have comparable physical, chemical thermal or other properties. Typically, however, they it will not be of the same materials or have comparable physical, chemical thermal or other properties, since a usual objective sought in using composites in the first place is to achieve a combination of characteristics in the finished product that is not attainable through the use of one constituent material alone. So combined, the reinforcement preform and the matrix material may then be cured and stabilized in the same operation by thermosetting or other known per se methods, and then subjected to other operations toward producing the desired component. It is significant to note at this point that after being so cured, the then solidified masses of the matrix material normally are very strongly adhered to the reinforcing material (e.g., the reinforcement preform). As a result, stress on the finished component, particularly via its matrix material acting as an adhesive between fibers, may be effectively transferred to and borne by the constituent material of the reinforcing reinforcement preform.

Frequently, it is desired to produce components in configurations that are other than such simple geometric shapes as (per se) plates, sheets, rectangular or square solids, etc. A way to do this is to combine such basic geometric shapes into the desired more complex forms. One such typical combination is made by joining reinforcement preforms made as described above at an angle (typically a right-angle) with respect to each other. Usual purposes for such angular arrangements of joined reinforcement preforms are to create a desired shape to form a reinforced reinforcement preform that includes one or more end walls or "T" intersections for example, or to strengthen the resulting combination of reinforcement preforms and the composite structure which it produces against deflection or failure upon it being exposed to exterior forces, such as pressure or tension. In any case, a related consideration is to make each juncture between the constituent components as strong as possible against being pulled apart as a result of forces being applied to it. Otherwise, given the desired very high strength of the reinforcement preform constituents per se, weakness of the juncture compared to that of each of the combined elements per se becomes, effectively, a "weak link" in a structural "chain". An example of this type of intersecting configuration is where one of two component elements is an elongated, flat, planar rib that is oriented substantially at right angles to and across a mid-span location of the other of the components which is in the form of a planar sheet. An objective often ought in such constructions is to inhibit or totally prevent the planar sheet from deflecting objectionably or failing as pressure is applied to it in the direction of the width dimension of the reinforcing rib. An second example is where the objective is simply to provide a juncture between intersecting elements (such as planar sheets per se, sheets and strips or other shapes, etc.) which will not fail upon forces being applied to one of the intersecting element in directions away from the other element which it intersects.

Various proposals have been made in the past for making such junctures. It has been proposed to form and cure a panel element and an angled stiffening element separate from each other, with the latter having a single panel contact surface or being bifurcated at one end to form two divergent, co-planar panel contact surfaces. The two components are then joined by adhesively bonding the panel contact surface(s) of the stiffening element to a contact surface of the other component using thermosetting adhesive or other adhesive material. However, when tension is applied to the cured panel or the skin of the composite structure, loads at unacceptably low values resulted in "peel" forces which separate the stiffening element from the panel at their interface since the effective strength of the join is that of the matrix material and not of the adhesive.

In addressing the problem of how to maximize the strength of the juncture or join between constituent elements against the separation of one of the elements from the other, a consideration is that while the reinforcement fibers themselves are usually characterized by (among other things) their great strength against applied forces, particularly in their long or linear dimension, the various matrix materials used in these applications do not have strength in any dimension comparable to that of the reinforcement preform reinforcement fibers. Matrix materials usually are selected primarily for having qualities such as the ability to bind reinforcing fibers to each other so as to transfer forces between the reinforcing fibers and for chemical or thermal resistance, in favor of which high strength is given low priority. Indeed, as previously pointed out, an objective in using the reinforcement constituent in composite materials in the first place is to enhance the strength characteristics of the composite structure far in excess of that attainable using the matrix material alone. Therefore, junctures relying on matrix material per se for their strength are insufficiently strong for this intended use.

To use metal bolts or rivets at the interface of such components is also unacceptable because such additions at least partially destroy and weaken the composite structures themselves, add weight, and introduce differences in the coefficient of thermal expansion as between such elements and the surrounding material.

Other approaches to solving this problem have been based on the concept of introducing high strength fibers across the join area through the use of such methods as stitching one of the components to the other and relying upon the stitching thread to introduce such strengthening fibers into and across the juncture site. One such approach is shown in U.S. Pat. No. 4,331,495 and its method divisional counterpart, U.S. Pat. No. 4,256,790 (to which, along with references cited in the prosecution of them, reference is made). These patents disclose junctures having been made between a first and second composite panels made from adhesively bonded fiber plies. The first panel is bifurcated at one end to form two divergent, co-planar panel contact surfaces in the prior art manner, that have been joined to the second panel by stitches of uncured flexible composite thread through both panels. The panels and thread have then been "co-cured": i.e., cured simultaneously.

This proposal also has proved inadequate, as is best evidenced by subsequent efforts to cope effectively with the same problem of join strength.

Those efforts are exemplified by the disclosures of U.S. Pat. No. 5,429,853. This patent sets forth a proposal to produce a join between reinforced composite components that are in the form of a panel and of strengthening rib. The latter is also based on prior art concept of one of them being in the form of an elongated strip which is angled linearly to so form it that it has a panel contacting bearing flange that is continuous with the rest of the rib which forms a stiffening flange. As disclosed, two such ribs may be joined to each other with their stiffening flanges back to back. The effect of this is effectively to create a bifurcated element having the panel contacting surfaces across the top of the "T" so formed. Whichever of these variants is used, the bearing flange(s) of the stiffening rib are placed in contacting juxtaposition with a the surface of the panel, and the two elements (i.e., the rib and the panel) are then joined by a fibrous "filament" or thread which is inserted vertically through the panel and into the reinforcing member, with some of the filament extending into and in line with the main body of the "stiffening flange" i.e., the portion of the stiffening rib which is vertical to the plane of the panel element. The asserted effect of this is to have some of the fibers that have been introduced by the filament extend from the panel element into the stiffening flange portion of the stiffening rib. While perhaps efficacious for certain purposes, such prior art constructions still do not exhibit the desired amount of strength against failure of such joins with consequent separation of the constituent reinforced elements from each other.

Accordingly, it is an object of this invention to provide means for effectuating a join between reinforcement preform elements for use in fiber-reinforced composite materials structures.

Yet another object of this invention is to provide means for satisfying the foregoing objective in embodiments in which said reinforcement preform elements are angularly disposed with respect to each other.

It is a further object of this invention to provide means for achieving one or more of the foregoing objectives wherein said join is of improved resistance to failure.

DESCRIPTION OF INVENTION

Desired objectives may be achieved through practice of this invention, embodiments of which include reinforcement preforms, and methods for making same, for use in fiber-reinforced composite materials structures. The reinforcement preforms comprise first and second reinforcement preform elements which include strength reinforcement fibers that are in desired directional orientation. The first such element has a cross-fiber surface which extends transverse of at least some its said constituent strength reinforcement fibers, which surface is in contacting juxtaposition to a selected surface region of the second element to form an abutment therebetween. Abutment strength reinforcing fibers, which may optionally be introduced in situ by a continuum of fibers, such as a yarn or thread, extend through at least a portion of said second element and its said selected surface region, said abutment, said cross-fiber edge surface, and into said first element substantially in the direction of orientation to some, at least, of those among its constituent strength fibers to which said cross-fiber surface is transverse.

DESCRIPTION OF DRAWINGS

This invention may be understood from the Description and Claims hereinafter set forth, and from the accompanying drawings in which:

DESCRIPTION OF PREFERRED EMBODIMENTS

Reference has already been made to U.S. Pat. No. 4,331,495 and its method divisional counterpart, U.S. Pat. No. 4,256,790. These patents disclose junctures between a first and second composite panels made from adhesively bonded fiber plies. The first panel is bifurcated at one end to form two divergent, co-planar panel contact surfaces in the prior art manner, and is joined to the second panel by stitches of uncured flexible composite thread and that assembly "co-cured" i.e., cured simultaneously. As will presently be seen, these patent references do not disclose the structural features and performance characteristics which uniquely distinguish the present invention from this prior art. More specifically, it should be noted that structurally, the intersections of constituent components according to these patents (1) always involve of the components having end portions which are directionally reoriented by being turned through about 90 degrees in order to present a contact surface to the associated component, and (2) do not contemplate positioning strengthening fibers so that they extend across the juncture between the two components being joined from one of the joined components into and substantially parallel with the strengthening fibers of the other. The significance of this in terms of performance as well as structure will be apparent from the discussion which follows.

Figure 1:
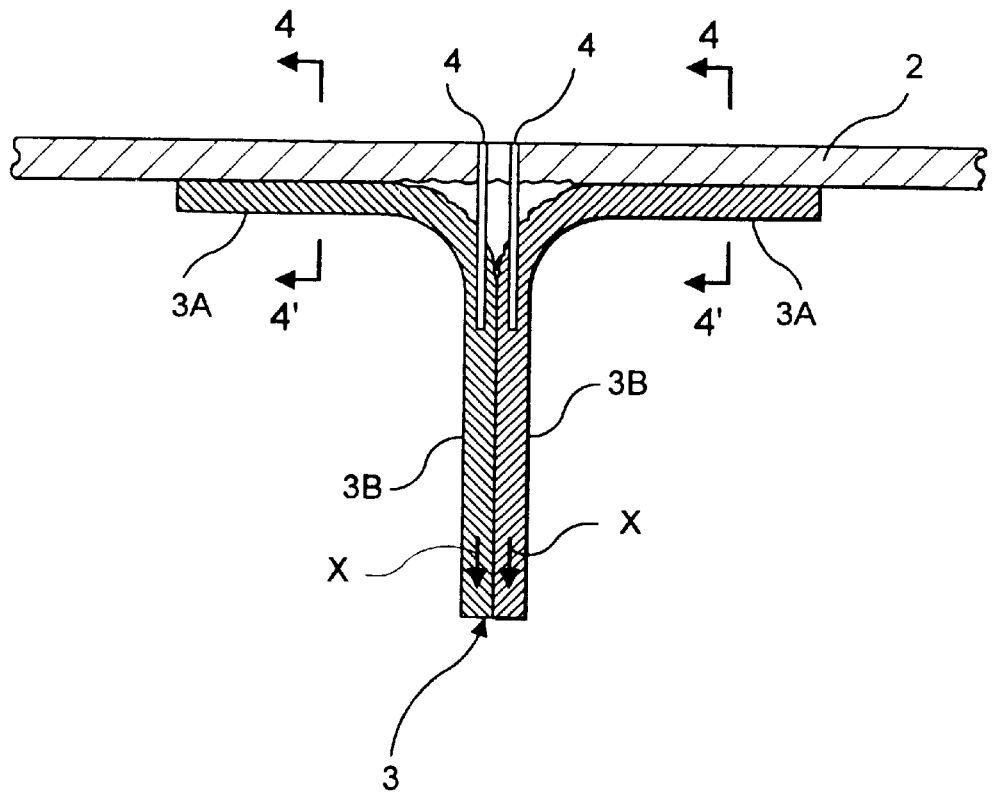
FIG. 1 is a cross-sectional view of an embodiment of prior art.

Reference has also been made U.S. Pat. No. 5,429,853. As illustrated in FIG. 1, for example, this patent discloses joins between reinforced composite components in the form of a panel 2 and a strengthening rib 3. The rib 3 is also based on prior art concepts in that it is made from one or two rib elements, each of which elements has been angled at about 90 degrees along its long dimension to form the rib 3 into a bearing flange 3A portion and a strengthening flange 3B portion. As such, the rib 3 may be utilized as a single such rib or, as shown in FIG. 1, as two such ribs whose stiffening flanges have been joined back to back to produce effectively a rib structure that is bifurcated at one end to present two "bearing flanges" or panel contacting surfaces 3A across the top of the "T". In either the single or double form, in terms of structural difference from the present invention, the result is the same as with embodiments of the other two cited patents in that in all of these prior art patent references, the junctures between constituent components always involve the end portion(s) of one of one of the joined components having been reoriented by having been turned through 90 degrees in order for it to present a contact surface to a surface of the associated component. Even leaving other structural distinctions aside, it will be clear from the discussion and description of the present invention which follows that in this respect, embodiments of the present invention structurally are different from those according to these prior art references. It will also be clear that this difference makes it possible, uniquely with the present invention, to make joins of demonstrably and materially higher strength against failure of the join and consequent separation of the joined reinforced elements from each other than is possible with those according to such prior art.

Figure 2:
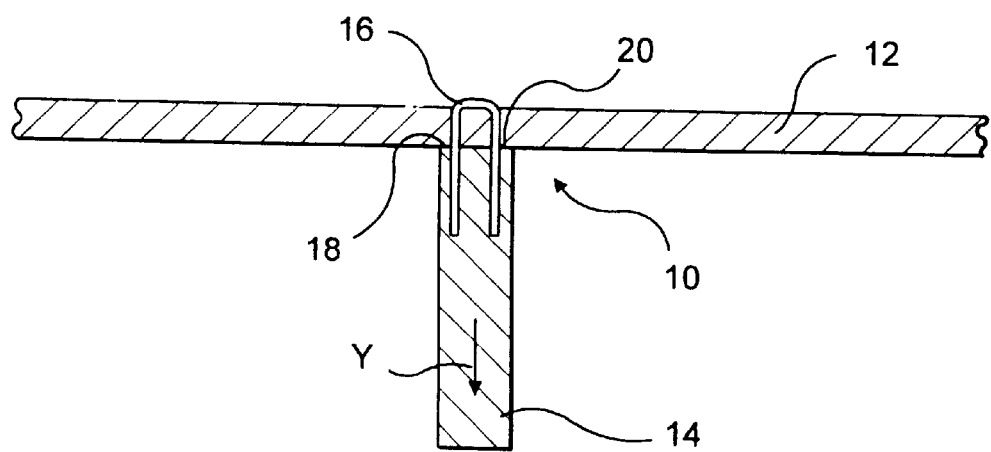
FIG. 2 is a cross-sectional of an embodiment of the present invention.

The structural features of embodiments according to the present invention will be clear from the embodiment which is illustrated in FIG. 2. This Figure shows a reinforcement preform 10 for use in making fiber-reinforced composite structures. It includes as associated constituent elements, a first reinforcement preform panel 12 which is intersected in mid-span by a second reinforcement preform panel 14. As shown in FIG. 2, these elements are oriented substantially at right angles to each other. However, it is to be understood that the advantages of the present invention may be realized in the context of a number of other embodiments, juncture situations (e.g., reinforcing ribs, end or center wall intersections, etc.) and intersection angles as between joined preform elements. Particularly to be noted in FIG. 2, however, is the "cross fiber-edge surface" 18 which forms the contact surface of the panel 14 where it abuts the selected portion 20 of the surface of associated element 12 where the two elements 12, 14 are joined to each other by means of reinforcing fibers which are introduced into the join area by means of a thread, yarn or other continuum 16.

It is to be noted in comparing the cited prior art references with the present invention, that in none of referenced prior art are reinforced preforms disclosed for use in making fiber-reinforced composite structures in which juxtaposed, abutting reinforced preform elements are joined to each other by means of the introduction of reinforcing fibers which extend across the join area from within one of the elements into the other, wherein the abutment is between a cross fiber-edge surface of one of the elements and portion of a surface of the other element. As will be demonstrated, not only is that feature of the present invention different structurally from the referenced prior art, but that difference is highly significant because it results in junctures that are much stronger than those attainable with prior art teachings.

It is to be understood that as used herein, the following meanings are to be attributed to these terms:

The term "substantially" is to be construed to mean that the condition or state of affairs to which that term is being applied will obtain even to states or conditions which vary therefrom, provided that such variances do not produce results which are significantly or materially different from those which would occur but for such variances.

The term "cross fiber" is to be construed to mean transverse to the general direction of and intersecting fibers which have been included in a reinforcement preform for the purpose of reinforcing its strength. Although "cross fiber" may be substantially at right angles with respect to said general direction, it may vary from that orientation.

The term "cross fiber surface" is to be construed to mean a surface of a reinforcement preform or element thereof which extends in a "cross fiber" direction.

Although depicted in FIG. 2 as being in a simple inverted "U" shape, the continuum 16 may be in any of a wide variety of forms and configurations, including (without limitation) direct inserts, sequential stitches in a thread-like or yarn-like grouping of fibers (as in the form of sliver or tow), and may optionally be made from the same materials selected to be the composite reinforcing material. Typically, the line of stitches may extend in the direction of the intersecting reinforcement element, since it is in this direction that the abutment itself occurs. In the end, the object is to introduce reinforcing fibers, by whatever means, across the juncture between the two constituent elements of the reinforcement preform so as to impart high strength to the join between them. Once in place, the introduction of known per se matrix material into the intersticial portions of the reinforcement preform and around it has the effect of "gluing", or surface adhering the ends, at least, of the juncture bridging fibers to the reinforced preform elements themselves. Thus affixed, the integrity of the juncture against failure becomes primarily a function of the ability of the juncture bridging fibers which interconnect the reinforcement preform elements to withstand stress since, as previously noted, the matrix material is comparatively lacking in such strength compared to the material of the reinforcing fibers.

The question aside for the moment of why this structural difference between the present invention and the cited prior art produces significantly different results, at this point there will be described test results which demonstrate that such differences do result and that they are very material to achieving the desired result of much higher strength joins between constituent elements of reinforcement preforms for reinforced composite structures.

EXAMPLES

Five test samples were constructed substantially as disclosed in U.S. Pat. No. 5,429,853 as illustrated in FIG. 1 attached. Five more were constructed substantially in accordance with the present invention and as illustrated in FIG. 2 attached. In all cases, substantially identical jigs and other appliances were attached to all of samples in order to adapt them to the testing apparatus and, as nearly as possible, to isolate the test results from factors extraneous to determining the strength of the joins per se in each. The samples were of substantially identical size and dimensions, and were made using identical carbon yarns for reinforcing and joining, and epoxy matrix materials of substantially the same quality, dimensions and other compositional and physical properties, and the tests were conducted under substantially identical test conditions. The stitching was oriented in the direction of the long axes of the reinforcing ribs and was of the same stitch density in all samples. So prepared, the joins in the samples were stress tested in an Instron #4206 at a cross-head speed of 0.2"/min. The results of these tests on the samples according to U.S. Pat. No. 5,429,853 are set forth in "Table I", and on those according to the present invention are set forth in "Table II", which follow and show the maximum load to failure (in pounds) for each:

TABLE I

| Sample ID | Maximum Load (lbs) |
| --- | --- |
| A1 | 1624.0 |
| A2 | 1661.0 |
| A3 | 1402.0 |
| A4 | 1602.0 |
| A5 | 1439.0 |
| Mean: | 1546.0 |
| SD | 117.0 |

TABLE II

| Sample ID | Maximum Load (lbs) |
| --- | --- |
| T2-1 | 2933.0 |
| T2-2 | 3104.0 |
| T2-3 | 3028.0 |
| T2-4 | 2754.0 |
| T2-5 | 2862.0 |
| Mean: | 2936.0 |
| SD | 137.2 |

In summary, these tests indicate that joins made according to the teachings of the present invention are about twice as strong as those made according to the teachings of U.S. Pat. No. 5,429,853.

From the foregoing, the substantial advantages that may be achieved through practice of the present invention will be apparent. As to why those benefits result, without intending to be bound by any theory, the following comments are offered by way of possible explanations.

Figure 3:
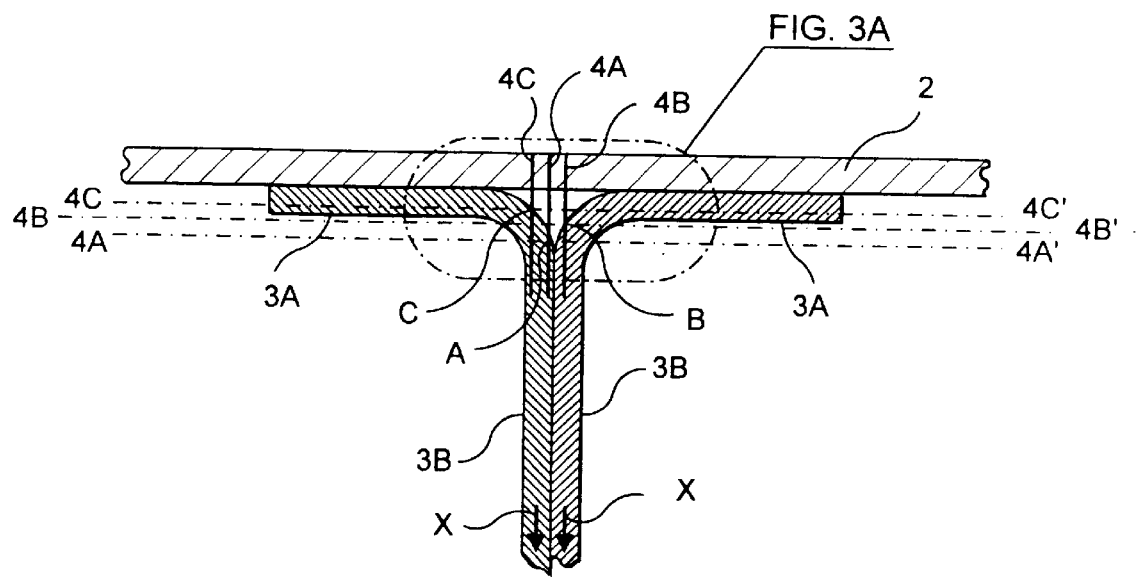
FIG. 3 is a cross-sectional view of the embodiment of prior art shown in FIG. 1.
Figure 3A:
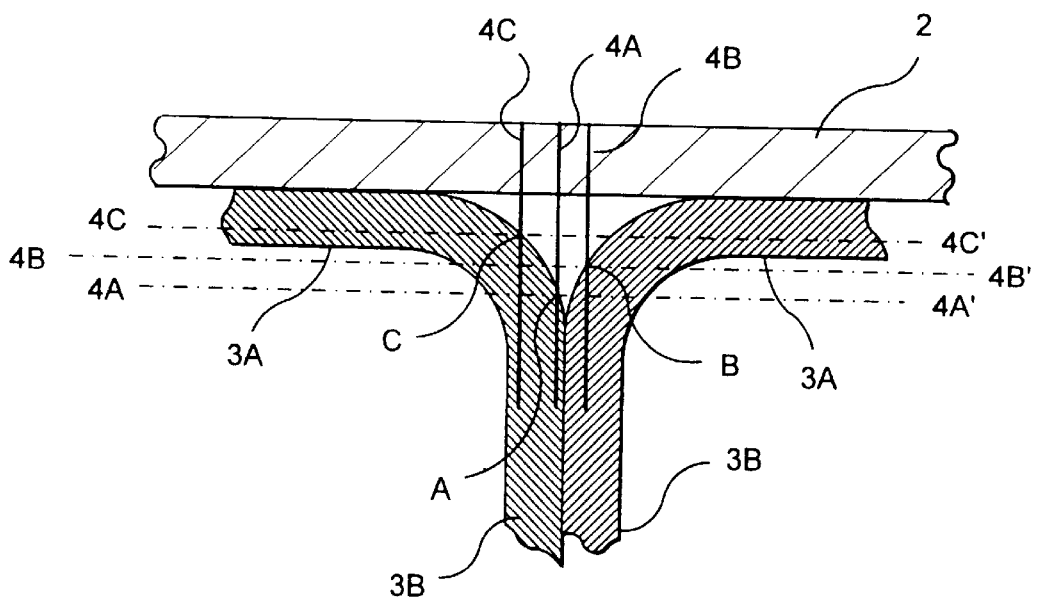
FIG. 3A is an enlargement of a portion of FIG. 3.

Reference is made first to the prior art embodiment shown in FIGS. 3 and 3A which, it will be noted, is generally the same construction as that shown in the accompanying FIG. 1, where the basic join configuration of the components is like the bifurcated junctures that are also shown in and contemplated by U.S. Pat. Nos. 4,256,790 and 4,331,495. A characteristic of the embodiments illustrated in these patent references is that a radius is formed at the outside surface of the transition from the stiffening flange 3A to the bearing flange 3B (or their structural equivalents). It is created by the bearing flanges 3A bending away from the stiffening flange 3B of the element 3, in these cases, by about 90 degrees. Due to that curve, however small it may be in radius, a gap of some dimension is created between the top of the pairs of curves in the element 3 and the underside surface of the element 2. (Of course, in this bifurcated version, the two curves of the two constituent elements create a gap. If a single such element were being used, there would not be such a gap. But as will be apparent, the result in terms of the latent strength deficiencies of such structures will apply as well as in the bifurcated form). As is known per se, this gap is usually filled with a composite filler material that generally exhibits low stiffness, the function of which is to preclude formation in the gap of a large continuous mass of matrix material when it is introduced to the preform. Further, it is to be noted from accompanying FIGS. 3 and 3A that depending upon where, relative to the line of bifurcation, the continuous filaments 4A, 4B, 4C are positioned in that configuration of intersecting preform components, the length of each filament across this gap will differ materially. This is illustrated in accompanying FIGS. 3 and 3A by showing the points at which these filaments become encased in the elements 3: all of them being encased in the element 2 more or less to the same level of its bottom surface. Thus, filament 4A (which enters flange 3A at point "A", represented by line 4A-4A') has the longest gap length. The gap length of filament 4B (the next longest filament), and the gap length of filament 4C (the shortest filament) are determined by their respective points of entry into the flanges 3A at points "B" and "C" respectively (represented by lines 4B-4B' and line 4C-4C' respectively). It is concluded that the comparative length of these filaments represents a significant characteristic, possibly for the following reasons. The ends of the filaments, once they have been encased in matrix material that has been cured, are more or less firmly and rigidly bonded to the body of the elements 2 and 3. Their ability to stretch therefore is materially inhibited within those regions of encasement. Thus, upon the application of tension downward upon the elements 3 (for example), any stretching of the filaments 4A, 4B, 4C that does occur before they break will be disproportional as between the three filaments and will decrease as does the amount of their "free" length across the gap since the longer the free length, the more it can be stretched (in absolute terms) before failing. This means that each will become loaded to the point of failure at a different time and that while all of them may bear some portion of the total load at a given point in time, in that event they will only do so disproportionally and with some of them only partially load bearing. Further, each will bear the preponderance of the tension forces sequentially rather than simultaneously. Thus, their ability to cause the join to withstand failure is not cumulative as might be the expected result of placing a multiplicity of filaments in the join region. Since those filaments (e.g., 4C) which are closer to the point where the curved portions of the bifurcated flanges 3A meet the under-surface of the panel 2 have the shorter gap lengths, they are less extensible than and will therefor fail before those having greater gap lengths (e.g., 4B), while those closest to the line of bifurcation (e.g., 4A) are most extensible and will fail last in sequence. It is postulated that this explains why typically such junctures are observed usually to fail first where the curved portions of the bifurcated flanges 3A meet the under-surface of the panel 2: failures which are associated with the process that is known technically as "peeling".

Figure 4:
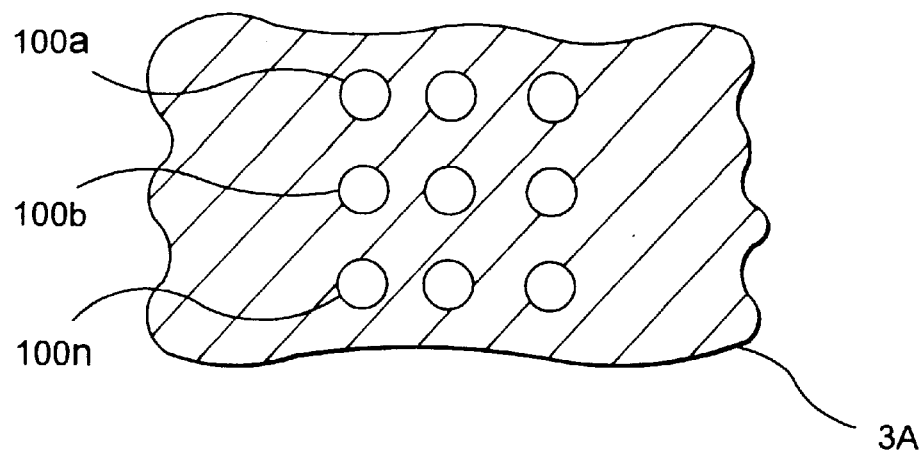
FIG. 4 is a cross-sectional view of portions of the prior art embodiment shown in FIG. 1.

It should also be noted that in such constructions, this deficiency would not be remedied even if there were no curve formed at the outside surface of the transition from the stiffening flange 3A to the bearing flange 3B (or their structural equivalents); if, for example, that curved surface were eliminated and replaced with a square corner. It is concluded that such a change, even if it were possible to be made, would result in a structure that would be different structurally from the present invention and could not achieve comparable results. Again, without intending to be bound by any theory, that conclusion may be explained on the following basis. A usual way of making the reinforcement preform for structures such as the flat, strip-like member from which the element 3 is formed, is by a lamination of successive plies of the reinforcement material, with the fibers or yarns of each of the plies optionally being oriented more or less in one direction or oriented at angles with respect to those of the next adjacent plies. The inter-laminar properties of such constructions, such as their "softness" or stiffness, strength, etc., are known to be low compared to those properties in the direction indicated by the arrows "X" in FIGS. 1 and 3, which indicate the plane of orientation of the preponderance the reinforcement fibers in the element 3. However, that deficiency normally is tolerable because in that direction at least, the structure can be made to be sufficiently strong against the forces which are to be applied to this element. But where the juncture end of the structure either bifurcates or appears as a single, deflected element (e.g., to form a bearing flange), and the bearing flange(s) reorient directionally through 90 degrees, the "high strength" direction ("X" in FIGS. 1 and 3) of the fibers in the angularly deflected portion also reorients. The result is that, as shown in FIG. 4, a cross-section taken along lines 7-7' in FIG. 1, the laminations 100a, 100b, . . . 100n, of fibers in the bearing flange(s) 3A are no longer oriented in the same direction as are those of the in the stiffening flange 3B, but instead are reoriented substantially horizontal to the underside of the of the element 2. Therefore, forces transmitted to the juncture by the bearing flange(s) 3A will be exposed to the comparatively inferior inter-laminar strength, stiffness or "softness", and other properties: those forces now being transmitted across the laminations of reinforcing fibers of the flange(s) 3A and across the intersticial masses of matrix. Thus, as one proceeds along the elements 3 from their stiffening flange portions 3B into their bearing flange portions 3A, the strengthening effect of their fibers becomes increasingly ineffectual, whereas, with the present invention, the juncture reinforcing fibers are concentrated in the region of force application to the juncture and bear applied loads substantially simultaneously rather than sequentially. It is thought that the foregoing-described processes or a combination of them may be significant factors in the previously noted observation that such prior art devices appear to fail in the first instance from the outermost points of the gap between the elements 2 and 3 rather than at its center and resulting "peeling effect".

Figure 5:
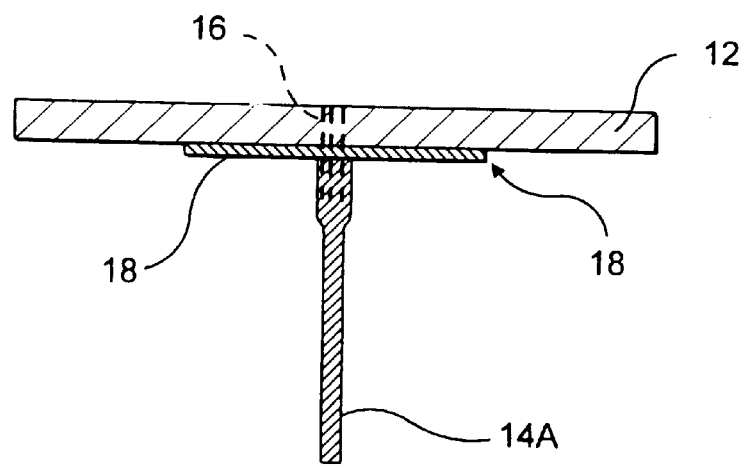
FIG. 5 is a cross-sectional view of another embodiment of the present invention.

In addition, with prior art devices, adding reinforcement fibers to the join area is progressively less effective rather than cumulative in terms of strengthening, since the loading of the fibers is seriatim rather than simultaneous. In contrast, with the present invention, reinforcement fibers may be added across the join area to an extent that effectively is limited as to number only by the thickness of the butt end (cross-fiber surface) of the intersecting element. In further contrast, with the present invention, the effect of each such addition will be substantially additive and cumulative with the others. This superior feature of joins according to the present invention is apparent from another set of tests that were done. Five more samples were prepared that were substantially identical to and were tested in the same manner with those for which the results in "Table II" were tabulated, except for the addition of one more line of stitches of reinforcement fibers through the join area. That is to say, they were made in accordance with the present invention, except that, as shown in FIG. 5, the intersecting reinforced preform element 14A (which compares to element 14 in FIG. 2) was constructed with a thicker abutment end so that three rows of joining filaments (and therefore more strength fibers) rather than two could be inserted from the element 12 into the butt end of the element 14A. The samples so produced were then tested on the same machine and under the same conditions as had been the samples tabulated in Tables "I" and "II" above. The results of these tests are tabulated as follows in "Table III":

TABLE III

| Sample ID | Maximum Load (lbs) |
| --- | --- |
| T1 | 4301.0 |
| T2 | 4349.0 |

TABLE III-continued

| Sample ID | Maximum Load (lbs) |
|---|---|
| T3 | 3985.0 |
| T4 | 3972.0 |
| T5 | 4805.0 |
| Mean: | 4282.0 |
| SD | 340.0 |

These results when compared to the results set forth in "Table I" (above) clearly confirm that since a greater number of effective reinforcement fibers can be inserted through the join, even much higher join strengths can be attained with the present invention than with prior art devices.

It is to be understood that the embodiments herein disclosed, discussed and illustrated are by way of illustration and not of limitation and that this invention may be practiced in a wide variety of applications and embodiments without departing from the spirit or scope of this invention.

I claim:

1. A reinforcement preform for use in fiber-reinforced composite materials structures comprising
   first and second elements which include strength reinforcement fibers that are in desired directional orientation,
      said first element having a cross-fiber surface which extends transverse of at least some of said constituent strength reinforcement fibers and
         is in contacting juxtaposition to a selected surface region of said second element to form an abutment therebetween,
   and abutment reinforcing fibers which extend through at least a portion of said second element and its said selected surface region, across said abutment, through said cross-fiber surface, and into said first element substantially in the direction of orientation of some, at least, of those among its constituent strength fibers to which said cross-fiber surface is transverse.

2. The preform described in claim 1 wherein said abutment strength reinforcing fibers are constituents of a fibrous continuum, by the insertion of which said abutment strength reinforcing fibers are positioned in situ.

3. The preform described in claim 2 wherein said first element is angularly disposed with respect to said selected surface region of said second element.

4. The preform described in claim 3 wherein said first element is angularly disposed with respect to said selected surface region of said second element at an angle of substantially 90 degrees.

5. The preform described in claim 2 encased in matrix material with the intersticial areas between its constituent elements substantially filled with matrix material.

6. The preform described in claim 1 wherein said first element is angularly disposed with respect to said selected surface region of said second element.

7. The preform described in claim 6 wherein said first element is angularly disposed with respect to said selected surface region of said second element at an angle of substantially 90 degrees.

8. The preform described in claim 1 encased in matrix material with the intersticial areas between its constituent elements substantially filled with matrix material.

9. A reinforcement preform for use in fiber-reinforced composite materials structures comprising
   a first planar element which includes strength reinforcement fibers that are oriented so as to render said element with increased strength in at least one direction,
   a second planar element which is angularly disposed with respect to the planar surface of said first element and substantially continuously abuts a planar surface of said second element that extends across and intersects strength reinforcement fibers which form a constituent part of said second element and are so oriented as to render said second element with increased strength in the direction away from said first element,
   abutment reinforcing fibers which extend through at least a portion of said first element and its said planar surface, across the abutment between said first and said second elements, through said edge surface of said second element, and into said second element that is provided by said constituent strength fibers.

10. The preform described in claim 9 wherein said first element is angularly disposed with respect to said selected surface region of said second element at an angle of substantially 90 degrees.

11. The preform described in claim 10 encased in matrix material with the intersticial areas between its constituent elements substantially filled with matrix material.

12. The preform described in claim 9 encased in matrix material with the intersticial areas between its constituent elements substantially filled with matrix material.

13. A method of making a reinforcement preform for use in fiber-reinforced composite materials structures, comprising the steps of
   making first and second preform elements which include strength reinforcement fibers that are in desired directional orientation, with said first element having a cross-fiber surface which extends transverse of at least some of its said constituent strength reinforcement fibers,
   positioning said cross-fiber surface in contacting juxtaposition with a selected surface region of said second element to form an abutment therebetween, and
   positioning abutment reinforcing fibers so that they extend through at least a portion of said second element and its said selected surface region, across said abutment, through said cross-fiber surface, and into said first element substantially in the direction of orientation of some, at least, of those among its constituent strength fibers to which said cross-fiber surface is transverse.

14. The method described in claim 13 wherein said step of positioning said abutment strength reinforcing fibers is carried out using constituent fibers of a fibrous continuum by the insertion of which said fibers are positioned in situ.

15. The method described in claim 14 wherein said step of positioning said first element with respect to said second element is carried out by angularly disposing said first element with respect to said selected surface region of said second element.

16. The method described in claim 15 wherein said step of positioning said first element with respect to said second element is carried out by angularly disposing said first element with respect to said selected surface region of said second element at an angle of substantially 90 degrees.

17. The method described in claim 14 including the further step of encasing said preform and substantially filling the intersticial areas between its constituent elements with matrix material.

18. The method described in claim 13 wherein said step of positioning said first element with respect to said second element is carried out by angularly disposing said first element with respect to said selected surface region of said second element.

19. The method described in claim 18 wherein said step of positioning said first element with respect to said second element is carried out by angularly disposing said first element with respect to said selected surface region of said second element at an angle of substantially 90 degrees.

20. The method described in claim 13 including the further step of encasing said preform and substantially filling the intersticial areas between its constituent elements with matrix material.

21. A reinforcement preform for use in fiber-reinforced composite materials structures comprising:

first and second elements which include strength reinforcement fibers that are in desired directional orientation, said first element having a cross-fiber surface which extends transverse of a strength imparting number of said constituent strength reinforcement fibers and is in contacting juxtaposition to a selected surface region of said second element to form an abutment therebetween, and abutment reinforcing fibers which extend through at least a portion of said second element and its said selected surface region, across said abutment, through said cross-fiber surface, and into said first element substantially in the direction of orientation of the strength imparting number of constituent strength fibers to which said cross-fiber surface is transverse.

* * * * *

UNITED STATES PATENT AND TRADEMARK OFFICE
CERTIFICATE OF CORRECTION

| | | |
|---|---|---|
| PATENT NO. | : 6,103,337 | Page 1 of 1 |
| DATED | : August 15, 2000 | |
| INVENTOR(S) | : Keith E. Burgess | |

It is certified that error appears in the above-identified patent and that said Letters Patent is hereby corrected as shown below:

<u>Column 12,</u>
Line 9, please insert the following after "said":
-- first element along an edge surface of --

Signed and Sealed this

Eleventh Day of February, 2003

JAMES E. ROGAN
*Director of the United States Patent and Trademark Office*